United States Patent [19]

Saarela et al.

[11] Patent Number: 4,807,522
[45] Date of Patent: Feb. 28, 1989

[54] PISTON AND ATTACHING APPARATUS FOR PISTON-AND-CYLINDER ARRANGEMENTS

[75] Inventors: Olli Saarela, Vantaa; Vesa Helske; Erkki Haapanen, both of Kuorevesi, all of Finland

[73] Assignee: Valmet Oy, Finland

[21] Appl. No.: 916,701

[22] Filed: Oct. 8, 1986

[30] Foreign Application Priority Data

May 20, 1986 [FI] Finland ................... 862116

[51] Int. Cl.$^4$ ............................ F01B 29/00
[52] U.S. Cl. ..................... 92/161; 92/161.5; 92/170; 244/104 R; 188/322.11
[58] Field of Search ............ 92/161, 169.1, 146, 92/169.2, 161.5, 170; 188/321.11, 322.11, 315; 244/104 R, 104 FP, 102 R

[56] References Cited

U.S. PATENT DOCUMENTS

| | | | |
|---|---|---|---|
| 2,678,247 | 5/1954 | Geyer et al. | 92/170 |
| 2,838,300 | 6/1958 | Gray | 92/170 |
| 2,892,626 | 6/1959 | Scott | 244/104 R |
| 3,020,981 | 2/1962 | Day | 244/104 FP |
| 3,059,586 | 10/1962 | Brailsford | 92/170 |
| 3,363,894 | 1/1968 | Hill | 244/104 R |
| 3,703,125 | 11/1972 | Pauliukonis | 92/170 |
| 4,207,807 | 6/1980 | Takata et al. | 92/170 |
| 4,315,454 | 2/1982 | Knödel | 92/170 |
| 4,407,396 | 10/1983 | Sirven | 188/322.11 |
| 4,527,781 | 7/1985 | Pees et al. | 188/315 |
| 4,697,499 | 10/1987 | Dirkin et al. | 92/170 |

FOREIGN PATENT DOCUMENTS 53-38850  4/1978  Japan ................... 92/248

Primary Examiner—Robert E. Garrett
Assistant Examiner—Thomas Denion
Attorney, Agent, or Firm—Steinberg & Raskin

[57] ABSTRACT

In combination with a piston-and-cylinder arrangement, supporting and attaching apparatus for attaching the piston-and-cylinder arrangement to a supporting structure and for supporting the piston-and-cylinder arrangement includes a frame attached to the cylinder for transmitting loads acting on the piston-and-cylinder arrangement to the supporting structure, the frame having a shell-type design disposed over at least a portion of the cylinder and a mechanical joint for attaching the frame to the cylinder. The supporting and attaching apparatus include a reinforcing rib which closes an end of the frame adjacent to the closed end of the cylinder, the reinforcing rib being coupled to the closed cylinder end. The frame is clamped on the piston-and-cylinder arrangement against a sleeve-like collar that projects from the cylinder by a bolt joint which attaches the reinforcing rib to the closed end of the cylinder. At least the frame is formed of a composite material comprising a thermosetting plastic reinforced with continuous fibers.

17 Claims, 2 Drawing Sheets

4,807,522

PISTON AND ATTACHING APPARATUS FOR PISTON-AND-CYLINDER ARRANGEMENTS

BACKGROUND OF THE INVENTION

The present invention relates to a combination of a piston-and-cylinder arrangement and supporting and attaching apparatus including a frame attached to the cylinder of the piston-and-cylinder arrangement for transmitting loads acting on the piston-and-cylinder arrangement to the supporting structure to which the piston-and-cylinder arrangement is attached.

In particular, the invention relates to supporting and attaching apparatus for a piston-and-cylinder arrangement which is lightweight and which is adapted to operate under rigorous, high stress conditions. One important application of the invention is in connection with aircraft landing gears which require both lightweight and high strength construction.

Generally, the landing gear of an aircraft enables the aircraft to operate on the ground. The landing gear is therefore subjected to extremely high stress conditions. The landing gear performs four functions and therefore must be designed with these functions in mind. In particular, firstly, the landing gear must serve as a static support for the aircraft when the aircraft is on the ground. Secondly, the landing gear enables the aircraft to taxi on the ground during take-off and landing. Thirdly, the landing gear must be capable of absorbing the vertical kinetic energy of the aircraft during landing. Finally, the landing gear must operate as a suspension and shock damping element in order to absorb impact forces which are directed on it as the aircraft moves over the ground due to bumps and other discontinuities in the ground. The landing gear of an aircraft generally comprises in its entirety wheels, brakes, a shock absorber unit and the necessary structural components by which these elements are joined to the structure of the aircraft.

The shock absorbing function of most conventional aircraft landing gears is performed by a component which operates in accordance with the oleo-pneumatic principle. Such landing gears are considered to absorb vertical energy most efficiency for a given weight and size. In such landing gears, the shock absorbing component comprises a piston-cylinder combination which is partially filled with hydraulic fluid and partially with air or nitrogen gas. The piston and cylinder are adapted to move with respect to each other, usually by means of slide bearings. During landing of the aircraft, the vertical energy is absorbed as the piston, while sliding inwardly into the cylinder, forces the hydraulic fluid to flow through an orifice from one chamber in the cylinder to another. In certain landing gears of this type the flow through the orifice is controlled by means of a metering pin.

The piston-cylinder component of the landing gear usually functions not only as a shock absorbing component but also as a structural component of the landing gear. Other structural components of the landing gear include the fork, the trunnion, and torque links that prevent the wheel from freely castering. The trunnion is connected to the main aircraft structure by pivot pins or the like. In other types of landing gears, a separate component connected to the piston-cylinder or to the trunnion functions as the main structural component. In certain aircraft using this type of landing gear, this separate component comprises an actuator which is part of the landing gear retracting mechanism.

The components of conventional oleo-pneumatic landing gears are generally formed of metallic material. The fork, piston, cylinder and trunnion are usually made of steel while the torque links are usually made of aluminum or steel. A significant drawback of such metallic construction is the weight of the landing gear which reduces the load capacity of the aircraft. Of course, it is desirable to maximize the load-carrying capacity of an aircraft from an economic viewpoint.

Although conventional landing gears have the general construction described above, the landing gear of one type of aircraft will generally differ in detailed constructions from the landing gear of another aircraft, mainly due to the restricted space within which the landing gear must be provided and due to the location of the points at which the landing gear is connected to the aircraft structure. In many types of landing gears, the cylinder and the trunnion including the lugs are manufactured from a single forging. Depending on the particular design, the fork of the landing gear is either a full fork or a semi-fork. In some types of landing gears, the wheels, tires and brakes are situated on one side of the vertical axis of the landing gear in which case no fork is required at all.

SUMMARY OF THE INVENTION

It is an object of the present invention to provide new and improved supporting and attaching apparatus for a piston-and-cylinder arrangement.

Another object of the present invention is to provide new and improved supporting and attaching apparatus for aircraft landing gears having a substantially reduced weight relative to conventional constructions.

Briefly, in accordance with the present invention, these and other objects are attained by providing supporting and attaching apparatus in combination with a piston-and-cylinder arrangement, the supporting and attaching apparatus comprising a frame attached to the cylinder of the piston-and-cylinder arrangement through which loads acting on the piston-and-cylinder arrangement are transmitted to the supporting structure to which the piston-and-cylinder arrangement is attached, the frame member having a shell-type design disposed over at least a portion of the cylinder and a mechanical joint for attaching the frame member to the cylinder.

As used herein, the term "shell-type design" and the like means a convex, dome-like structure or design such as, but not limited to, the type presenting a surface of revolution. In other words, a member having a shell-type design has a sheet-like structure shaped to be curved in a suitable manner.

The invention provides several advantages with respect to conventional constructions. For example, the supporting and attaching apparatus of the invention has substantially lower weight than any prior art designs. As noted above, a lightweight construction is very important, particularly in the case of aircrafts. Small aircrafts are used to transport freight, such as mail and the like, for which freight rates are high. Large economic savings are then achieved by even minor reductions in the weight of the aircraft itself. The invention provides a simple construction which is easy to manufacture since the supporting and attaching apparatus can be made as a unit which is separate from the cylinder and which can be connected to the cylinder subsequent to manufacture in an easy manner.

DESCRIPTION OF THE DRAWINGS

A more complete appreciation of the present invention and many of the attendant advantages thereof will be readily understood by reference to the following detailed description when considered in connection with the accompanying drawings in which.

DESCRIPTION OF THE PREFERRED EMBODIMENTS

Figure 1:
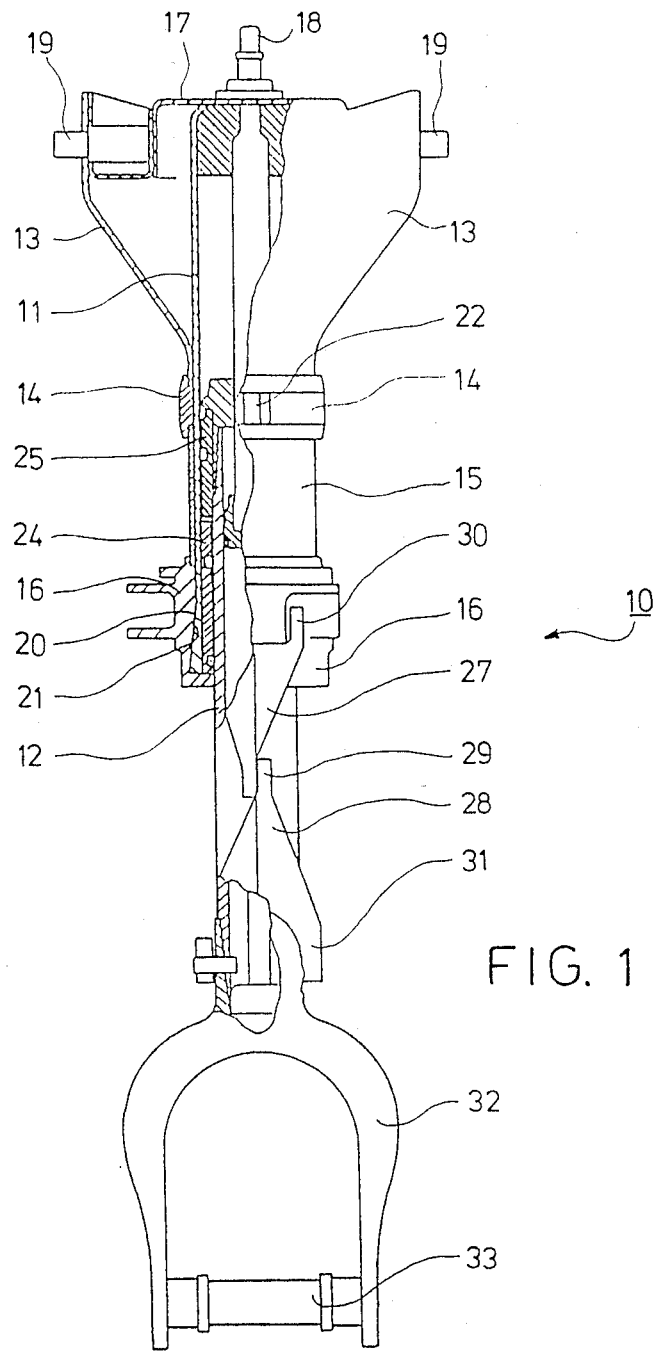
FIG. 1 is a schematic front elevation view, partly in section, of a piston and cylinder arrangement in combination with supporting and attaching apparatus in accordance with the present invention.

Referring now to the drawings wherein like reference characters designate identical or corresponding parts throughout the several views, the piston and cylinder arrangement, generally designated 10, is illustrated as comprising a part of the landing gear of an aircraft. However, it is understood that the combination of the invention can be utilized in connection with other types of piston-and-cylinder arrangements. The piston-and-cylinder arrangement 10 comprises a cylinder 11 having closed and open ends and a piston 12 extending through the open end of the cylinder 11 and slidably mounted therein in an axial direction.

As noted above, the piston and cylinder arrangement 10 comprises part of an aircraft landing gear and operates on the oleo-pneumatic principle. In order to reduce the weight of the landing gear construction, all of the structural components of the landing gear, except for the torque links 27 and 28 are preferably formed of composite material, i.e., a compound material formed of at least two components that are not dissolved in or fused with each other when combined. For example, reinforced plastics comprises one group of composite materials. Indeed, a preferred material from which the components of the landing gear of the invention are formed comprises plastic reinforced with continuous fibers. The fibers used to reinforce the plastic material must have a high tensile strength and modulus of elasticity. Continuous fibers formed of graphite can be advantageously utilized in the reinforced plastic material. Other examples of continuous fibers which may be used to reinforce the plastic material and that have sufficient strength and modulus of elasticity include fibers formed of glass and fibers formed of aramid.

The cylinder 11 and piston 12 of the piston and cylinder arrangement 10 advantageously take the form of tubes manufactured by winding such fiber-reinforced plastic. The walls of the piston and cylinder arrangement are preferably coated with the possible exception of the outer wall of cylinder 11.

The lower end region of cylinder 11 is formed with an outwardly facing conical surface 20 which widens towards the open end of the cylinder. A sleeve-like collar 16, preferably formed of metal, is affixed on the lower end region of cylinder 11 over the outwardly facing conical surface 20 thereof. In this connection, an inwardly facing conical surface 21 is formed in the sleeve-like collar 16 which mates with the outwardly facing conical surface 20 of cylinder 11 so that the joint between the sleeve-like collar 16 and cylinder 11 is a rigid, high strength joint. The sleeve-like collar 16 is preferably affixed to the cylinder by means of a suitable bonding agent.

A first sliding surface or slide bearing 24 is provided within cylinder 11 suitably registering with the sleeve-like collar 16. A second slide bearing or sliding surface 25 is provided on piston 12, preferably at its upper end. In this manner, the piston 12 is freely slidably mounted within cylinder 11, such sliding being aided by the slide bearings 24 and 25. Slide bearings 24 and 25 are preferably formed of a suitable plastic material. Alternatively, the sleeve-like collar 16 may be integrally formed with cylinder 11 in which case the cylinder and collar are formed of the same material. The sleeve-like collar 16 and cylinder 11 may both be advantageously formed of composite material whether they are formed integrally with or separately from each other.

The piston and cylinder arrangement is provided with supporting and attaching means for attaching the piston and cylinder arrangement to a supporting structure (not shown) and for supporting the piston and cylinder arrangement. The supporting and attaching means includes frame means attached to the cylinder 11 of the piston and cylinder arrangement for transmitting loads acting on the piston and cylinder arrangement to the supporting structure to which the piston and cylinder arrangement is attached. The frame means include a frame member 13 of shell-type design, i.e., a sheet-like structure shaped to be curved in a suitable manner as shown. The frame member 13 is closed at its top end by a cover-like reinforcing rib 17 attached to the frame 13 in a suitable manner. For example, the reinforcing rib 17 may be joined to the frame 13 by bonding or may be integrally formed during the manufacture of the frame 13 in which case both the frame 13 and reinforcing rib 17 are advantageously formed of a composite material as described below. In the illustrated embodiment, the reinforcing rib 17 takes the form of an inverted cup-shaped member surrounded by an annular trough-shaped member.

The plastic used in the composite material should be a thermosetting plastic, i.e., a plastic that becomes cross-linked as it is cured and which cannot be reshaped after curing. An example of a suitable thermosetting plastic is epoxy, although other thermosetting plastics having equivalent characteristics may be used.

The reinforcing fiber used in the composite material preferably is in the form of a fabric and/or braiding the fabric and/or braiding may be either dry, i.e., non-pretreated, or preimpregnated with a reinforcing material, such as a synthetic resin, to improve the adhesion of the fabric to the plastic material.

As noted above, sleeve-like collar 16 is rigidly affixed to the cylinder 11, such as by bonding. An intermediate tube 15 is disposed over cylinder 11 and has a diameter such that it fits snugly over the cylinder 11. One end of the intermediate tube 15 abuts the sleeve-like collar 16. A supporting sleeve 14 is also disposed over cylinder 11 having opposite ends abutting the intermediate tube 15 and frame 13. Thus, the supporting sleeve 14 and intermediate tube 15 are disposed over the cylinder 11 between the frame member 13 and the sleeve-like collar 16, the supporting sleeve 14 abutting the frame member 13 and the intermediate tube at its ends and the intermediate tube 15 abutting the supporting sleeve 14 and sleeve-like collar 16 at its ends.

In accordance with the invention, the frame member 13 of the supporting and attaching apparatus is affixed to the cylinder 11 by a mechanical joint. Referring to FIG. 1, the reinforcing rib 17 which is fixed to the frame 13 as described above to close the wide, open end of frame 13 is attached or coupled to the closed end (the top end in FIG. 1) of cylinder 11 by means of a bolt joint 18. The bolt joint 18 therefore fixedly clamps the frame 13 in the axial direction with respect to cylinder 11. Since the sleeve-like collar 16 is rigidly attached to the cylinder 11, the bolt joint 18 will at the same time secure the supporting sleeve 14 and intermediate tube 15 in their respective positions as described above. Although in the illustrated embodiment of the invention, the bolt joint clamps the frame member in place against the resistance provided by the sleeve-like collar 16 through the intermediary of the supporting sleeve 14 and intermediate tube 15, it is understood that the frame 13 may be shaped with a sufficient length so that it can be clamped directly against the sleeve-like collar 16 thereby eliminating the need for the supporting sleeve 14 and intermediate tube 15.

Axial loads acting on the piston-and-cylinder arrangement 10 are transmitted through the walls of the cylinder 11 to the sleeve-like collar 16 fixed to or integral with the cylinder and then through the intermediate tube 15, the supporting sleeve 14 and the frame 13 to pivot pins 19 provided at the upper end of frame 13 as shown in FIG. 1. Since the illustrated embodiment of the invention is specifically adapted to function as a landing gear for aircraft, the axial loads are primarily compressive loads which are transmitted in the manner described above. Indeed, the supporting and attaching apparatus of the invention would not be capable of withstanding large tension loads since such tension loads would act on the bolt joint 18 between cylinder 11 and frame 13.

Figure 2:
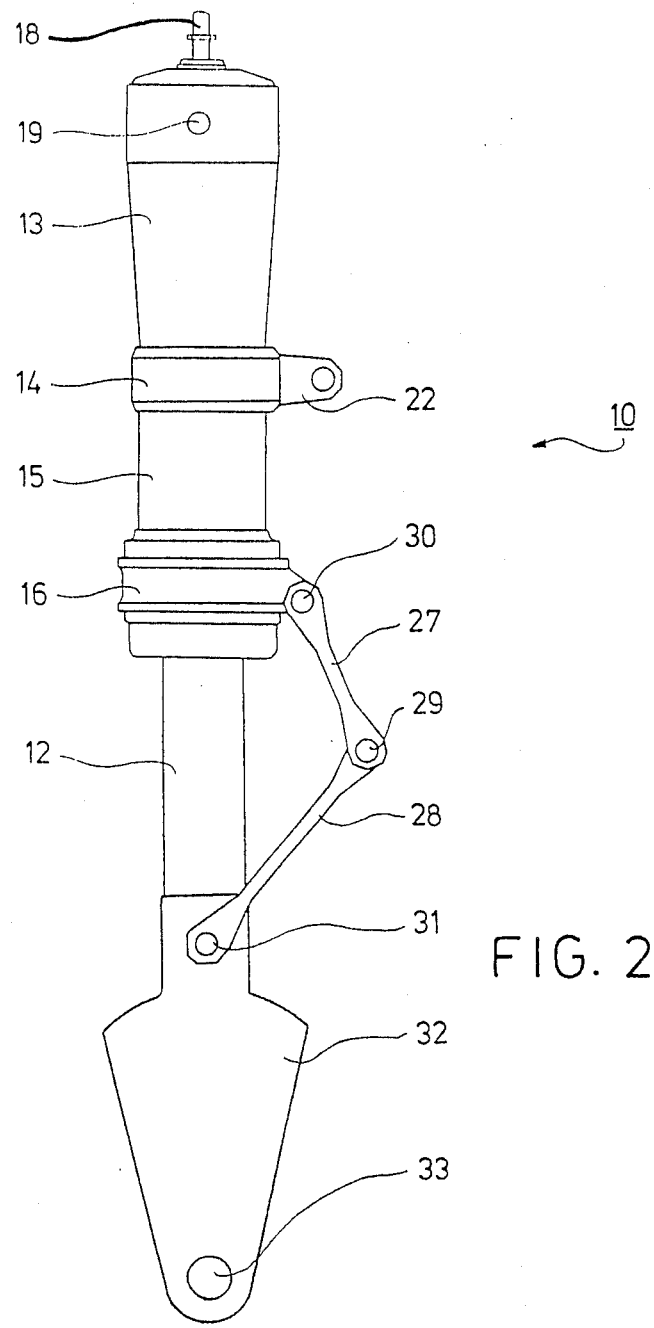
FIG. 2 is a side elevation view of the arrangement illustrated in FIG. 1.

Lateral loads acting in a direction parallel to the plane of FIG. 1 and perpendicular to the plane of FIG. 2 are transmitted from the cylinder 11 to the cylinder frame member 13 over the bolt joint 18 and over the joint between the frame member 13 and the cylinder 11. Any lateral loads acting on the piston-and-cylinder arrangement in a direction perpendicular to the plane in FIG. 1 are transmitted over the supporting sleeve 14 to a supporting bracket 22 integral with the supporting sleeve 14 and over the bolt joint between the frame 13 of the cylinder and the cylinder 11, to the pivot pins 19.

The remaining components of the landing gear of which the piston and cylinder arrangement 10 forms a part in the illustrated embodiment will now be described. An attachment lug 32 is attached to the piston 12 of the piston-and-cylinder arrangement 10. The lug 32 comprises a fork construction of shell-type design and comprises an axle pin 33 carried in a fork structure of the lug 32 to which the landing gear wheel is rotatably mounted. The loads acting on the wheel are transmitted to the piston-and-cylinder arrangement 10 through the axle pin 33. Torque links 27 and 28 are provided to prevent rotation of the cylinder 11 and piston 12 with respect to each other around their common central axis. The first torque link 27 is pivotally connected at 30 to the sleeve-like collar 16 in a manner such that the first torque link 27 can rotate on pivot 30 only about an axis perpendicular to the longitudinal central axis of the piston and cylinder arrangement 10. The second torque link 28 is pivotally mounted at 31 to attachment lug 32 which itself is fastened to piston 12 so that it can rotate only about an axis perpendicular to the longitudinal central axis of the piston-and-cylinder arrangement 10. The first and second torque links 27 and 28 are interconnected to each other by a pivot 29 so that the pivoting axes of all three pivots 29, 30 and 31 are parallel with each other. It will therefore be understood that the torque links 27 and 28 will constitute a toggle joint mechanism which will prevent rotation of the piston 12 with respect to the cylinder 11 but which will permit axial movement of the piston 12 with respect to the cylinder 11.

As set forth above, it is the provision of the frame member 13 having a shell-type design attached to cylinder 11 by means of a mechanical joint that distinguishes the supporting and attaching apparatus of the invention with respect to conventional designs and which gives rise to the advantages discussed above. In an advantageous embodiment, the cylinder frame member 13, as well as the main components of the piston and cylinder arrangement 10 are formed of composite material thereby rendering the assembly particularly advantageous for use in a landing gear for aircraft.

Obviously, numerous modifications and variations of the present invention are possible in the light of the above teachings. It will therefore be understood that within the scope of the claims appended hereto, the invention may be practiced otherwise than as specifically disclosed herein.

What is claimed is:

1. In combination with a piston-and-cylinder arrangement which includes a cylinder having closed and open ends and a piston extending through said open end of said cylinder and slideably mounted in said cylinder in an axial direction, supporting and attaching means for attaching the piston-and-cylinder arrangement to a supporting structure and for supporting said piston-and-cylinder arrangement, said supporting and attaching means comprising:

frame means attached to said cylinder of said piston-and cylinder arrangement for transmitting loads acting on said piston-and-cylinder arrangement to the supporting structure to which said piston-and-cylinder arrangement is attached, said frame means including a frame member having a shell-type design disposed over at least a portion of said cylinder, said frame of shell-type design having a first end substantially adjacent to said closed cylinder end, said first end being substantially wider than said closed cylinder end, said frame means further including reinforcing rib means closing said first end of said frame member, said reinforcing rib means coupled to said closed cylinder end, and said frame member having a second end proximate to said open cylinder end, said second end of said frame member being fit over said cylinder;

wherein said mechanical joint means includes a sleeve-like collar provided at said open cylinder end projecting outwardly from said cylinder and bolt joint means for affixing said reinforcing rib means to said closed cylinder end and for clamping said frame member in place against resistance provided by said sleeve-like collar;

wherein said sleeve-like collar is fixed to said cylinder at a bonded joint.

2. The combination of claim 1, wherein said bonded joint between said sleeve-like collar and said cylinder is formed at least in part by an outwardly facing conical surface formed on the outer surface of said cylinder and widening towards said open cylinder end, and an inwardly facing conical surface formed in said sleeve-like collar and mating with said outwardly facing conical surface, said conical surfaces being bonded to each other so that said joint between said sleeve-like collar and said cylinder is a rigid joint.

3. In combination with a piston-and-cylinder arrangement which includes a cylinder having closed and open ends and a piston extending through said open end of said cylinder and slidably mounted in said cylinder in an axial direction, supporting and attaching means for attaching the piston-and-cylinder arrangement to a supporting structure and for supporting said piston-and-cylinder arrangement, said supporting and attaching means comprising:
frame means attached to said cylinder of said piston-and-cylinder arrangement for transmitting loads acting on said piston-and-cylinder arrangement to the supporting structure to which said piston-and-cylinder arrangement is attached, said frame means including a frame member formed of composite material having a shell-type design disposed over at least a portion of said cylinder; and
mechanical joint means for attaching said frame member to said cylinder;
wherein said composite material comprises plastic reinforced with continuous fibers.

4. The combination of claim 3 wherein said plastic is a thermosetting plastic.

5. In combination with a piston-and-cylinder arrangement which includes a cylinder having closed and open ends and a piston extending through said open end of said cylinder and slidably mounted in said cylinder in an axial direction, supporting and attaching means for attaching the piston-and-cylinder arrangement to a supporting structure and for supporting said piston-and-cylinder arrangement, said supporting and attaching means comprising:
frame means attached to said cylinder of said piston-and cylinder arrangement for transmitting loads acting on said piston-and-cylinder arrangement to the supporting structure to which said piston-and-cylinder arrangement is attached, said frame means including a frame member having a shell-type design disposed over at least a portion of said cylinder, said frame of shell-type design having a first end substantially adjacent to said closed cylinder end, said first end being substantially wider than said closed cylinder end, said frame means further including reinforcing rib means closing said first end of said frame member, said reinforcing rib means coupled to said closed cylinder end, and said frame member having a second end proximate to said open cylinder end, said second end of said frame member being fit over said cylinder;
wherein said mechanical joint means include as sleeve-like collar provided at said open cylinder end projecting outwardly from said cylinder and bolt joint means for affixing said reinforcing rib means to said closed cylinder end and for clamping said frame member in place against resistance provided by said sleeve-like collar; and
wherein said mechanical joint means further include a supporting sleeve and an intermediate tube disposed over said cylinder between said frame member and said sleeve-like collar, said supporting sleeve abutting said frame member and said intermediate tube at its ends and said intermediate tube abutting said supporting sleeve and sleeve-like collar at its ends.

6. The combination of claim 5 wherein at least one of said frame member, reinforcing rib means, cylinder and intermediate tube are formed of composite material.

7. The combination of claim 6 wherein said composite material comprises plastic reinforced with continuous fibers.

8. The combination of claim 7 wherein said plastic is a thermosetting plastic.

9. The combination of claim 8 wherein said thermosetting plastic comprises epoxy.

10. The combination of claim 7 wherein said continuous fibers are in the form of a fabric.

11. The combination of claim 7 wherein said continuous fibers are formed of graphite.

12. The combination of claim 7 wherein said continuous fibers are formed of glass.

13. The combination of claim 7 wherein said continuous fibers are aramid fibers.

14. The combination of claim 5 wherein said frame member, reinforcing rib means, cylinder and intermediate tube are all formed of composite material.

15. The combination of claim 14 wherein said composite material comprises plastic reinforced with continuous fibers.

16. The combination of claim 15 wherein said plastic is thermosetting plastic.

17. In combination with a piston -nd-cylinder arrangement which includes a cylinder having closed and open ends and a piston extending through said open end of said cylinder and slideably mounted in said cylinder in an axial direction, supporting and attaching means for attaching the piston-and-cylinder arrangement to a supporting structure and for supporting said piston-and-cylinder arrangement, said supporting and attaching means comprising:
frame means attached to said cylinder of said piston-and-cylinder arrangement for transmitting loads acting on said piston-and-cylinder arrangement to the supporting structure to which said piston-and-cylinder arrangement is attached, said frame means including a frame member having a shell-type design disposed over at least a portion of said cylinder, said frame of shell-type design having a first end substantially adjacent to said closed cylinder end, said first end being substantially wider than said closed cylinder end, said frame means further including reinforcing rib means closing said first end of said frame member, said reinforcing rib means coupled to said closed cylinder end; and said frame member having a second end proximate to said open cylinder and, said second end of said frame member being fit over said cylinder;
wherein said mechanical joint means include a sleeve-like collar provided at said open cylinder end projecting outwardly from said cylinder and bolt joint means for affixing said reinforcing rib means to said closed cylinder end and for clamping said frame member in place against resistance provided by said sleeve-like collar; and
wherein said mechanical join means further include a supporting sleeve disposed over said cylinder between said frame member and said sleeve-like collar, said supporting sleeve abutting said frame member.

* * * * *